U̇nited States Patent Office 2,749,222
Patented June 5, 1956

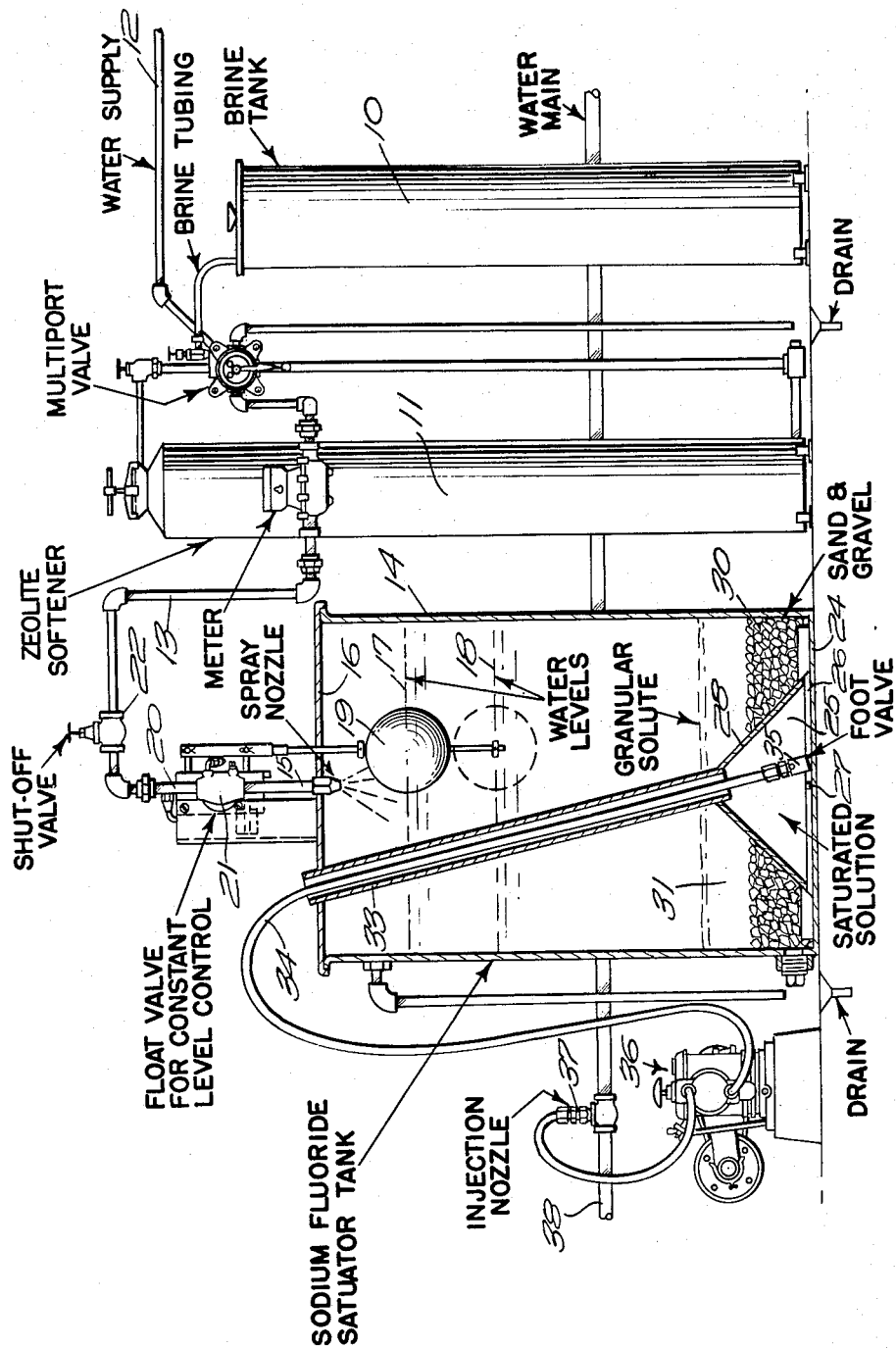

2,749,222
APPARATUS AND METHOD FOR PROVIDING A FLUORIDE SOLUTION

Henry F. Munroe, Cranston, R. I., assignor to Proportioneers, Inc., a corporation of Rhode Island Application August 30, 1951, Serial No. 244,347

1 Claim. (Cl. 23—272)

This invention relates to an apparatus and method for providing a solution of a fluoride ion such, for instance, as the dissolving of a fluoride salt in water.

Since it has become known that a fluoride in the water supply assists in preventing tooth decay in the users of such water, public health services in some towns where there is known to be a deficiency of fluoride in the drinking water have undertaken to provide such fluoride in the drinking water by directly supplying fluoride ion in a controlled amount to the drinking water, and thus there is a demand for an apparatus for providing a solution of fluoride which may be dissolved in the drinking water.

One of the objects of this invention is to provide a method by which a solution may be saturated with a fluoride so that the same may be injected into the water supply in a measured amount.

Another object of the invention is to provide a method which will utilize the physical characteristics of certain of the fluoride salts to enable these to be more easily placed in solution for feeding to the water supply.

Another object of the invention is to provide an apparatus by which the method may be simply and directly carried out.

With these and other objects in view, the invention consists of certain novel features of construction, as will be more fully described and particularly pointed out in the appended claim.

In the accompanying drawing:

The figure of the drawing is a diagrammatic view of an apparatus for the saturating of a water solution with a fluoride ion.

There are a number of fluoride compounds available but this invention relates more particularly to the use of such fluoride compounds as are in a crystalline form and deals particularly with sodium fluoride NaF and sodium fluosilicate Na$_2$SiF$_6$. The sodium fluoride is available in a powdered form which is usually white although frequently tinted a Nile blue, but this form is not suitable for use in this invention, as the powder is too fine to permit the solvent water to pass therethrough readily. The sodium fluoride is also available in a crystalline form and when allowed to dry slowly, larger crystals are provided. This is the form which I deal with in this invention. Sodium fluosilicate is also available in a crystalline form, although it does not have some of the desirable characteristics of the sodium fluoride and, therefore, I prefer the sodium fluoride for use in connection with this invention, although the principles of the invention may be applied to the sodium fluosilicate and I, therefore, include it herein.

Sodium fluoride will dissolve in water so as to provide approximately a four per cent solution with water. This is considered saturation. Sodium fluoride will go into solution at a fairly constant rate throughout a wide temperature range such as may be experienced where the process may be worked.

The sodium fluosilicate is not as soluble as the sodium fluoride. It dissolves to form .65 per cent solution in cold water and 2.46 per cent solution in hot water and, therefore, where there is a variation in temperature, the results will not be as uniform, nor will saturation provide as large a quantity of fluoride ion.

Referring to the drawing, the two tanks 10 and 11 represent the apparatus which receives the solvent water at 12 and so treats the water that it emerges through the pipe 13 in a sufficiently softened condition so as to be readily usable for picking up the fluoride ion which is the purpose of the remainder of the apparatus here shown.

This remainder of the apparatus comprises a tank 14 into which there projects a spray nozzle 15 to deliver the softened water into the top of the tank which is shown closed such as by a top 16. The water level may vary from the location 17 to the location 18 and the flow of the water through the nozzle 15 is controlled by a float 19 which will rise and fall with the water level from 17 to 18 to open or close the conduit 20 by means of the valve 21. This conduit may be completely shut off by the shut-off valve 22 when desired.

Near the bottom 24 of the tank 14 I provide a chamber 25 which is spaced from the bottom 24 as at 26 by legs 27 so that liquid may pass through this space and fill the chamber 25. A barrier 30 of some sort of material which will permit liquid to pass but will not permit solid material to pass is shown at 30 and in this particular instance sand and gravel provide this barrier. The solute which as above indicated consists of a fluoride salt in crystalline form will be located at 31 above the barrier 30 and resting upon it and will have a depth sufficient to provide the saturation desired by affording the time of contact necessary to saturate the solvent. Usually the depth will be greater than is necessary to provide the saturated four per cent solution so that the replenishing of this solute may be less frequent. The solute will be either sodium fluoride or sodium fluosilicate but I prefer sodium fluoride, as above indicated. From time to time this solute will have to be replaced by removing the top 16 as it is dissolved in the water which is located above it between the level 18 or 17 indicated.

A tube 33 communicates with the chamber 25 and extends to a point out of the tank through the solute and solvent so as to isolate this passage therefrom. Through this tube 33 I provide a conduit 34 which is controlled by a foot valve 35 at its lower end within the chamber 25 and which conduit extends to a device or pump 36 which will draw the solution from the chamber 25 and force it through the injection nozzle 37 into the main water supply passing through conduit 38. This device 36 will draw the saturated solution in a metered amount so that the main water supply will receive the correct amount of fluoride desired, which usually is one part per million for drinking water.

The rate at which the solution is withdrawn from the chamber 25 governs the time that the solvent water will contact the granular solute and, accordingly, the arrangement will be such that the water will be permitted to pick up its maximum amount or become saturated and the flow will be no faster where such saturation is the basis of the calculated amount of fluoride supplied. The concentration to saturation, however, may be controlled by the rate at which the solution is withdrawn from the chamber 25, as will readily suggest itself to a user.

Sodium fluoride is neutral and when it is used usually a half hour contact time with the water supply will give the four per cent solution desired over a wide range of temperatures which covers the range which would ordinarily be found in any location where the apparatus might be used for producing a solution of a fluoride ion.

The inverted cone prevents channelling or grooving of the soluble substance, which in this case is shown to be sodium fluoride, by the solvent. If the bed of sodium fluoride were solid and the solution outlet were centered at the bottom, the center of the bed would soon dissolve, leaving a mass of undissolved sodium fluoride adjacent the walls of the tank. By the construction which I have provided, the inverted cone is entirely within the tank and provides a storage space for the concentrated solution, which may be withdrawn by the feeder pump 36. The cone will be so sized as to provide a saturated solution at the maximum withdrawal rate as will be determined by the capacity of the pump 36 which extracts the fluid therefrom.

I claim:

In an apparatus for providing a solution of a fluoride ion, a tank, a conical chamber within the tank below the upper end thereof with the base of the cone adjacent the lower end of the tank and having an inlet communication at its base from the tank and an outlet extending upwardly through the upper end of the tank and isolated from the remainder of the contents of the tank above it, a barrier for holding the solid solute from passing through the inlet to the chamber but permitting the solvent to pass therethrough, means to maintain the level of the solution above the solid solute within a predetermined range, and means to withdraw the solution from the chamber at a rate to control the contact time of the solvent with the solid solute.

References Cited in the file of this patent

UNITED STATES PATENTS

| | | |
|---|---|---|
| 1,500,096 | Oxley | July 1, 1924 |
| 2,072,385 | Schwartz | Mar. 2, 1937 |
| 2,377,363 | Noble | June 5, 1945 |
| 2,486,318 | Newsome | Oct. 25, 1949 |
| 2,500,042 | Nutting | Mar. 7, 1950 |
| 2,555,340 | Hopper | June 5, 1951 |
| 2,585,387 | Heisler | Feb. 12, 1952 |
| 2,643,226 | White | June 23, 1953 |
| 2,671,755 | Anderson | Mar. 9, 1954 |